United States Patent
Knoppert

(10) Patent No.: US 11,671,528 B2
(45) Date of Patent: *Jun. 6, 2023

(54) ROBOTIC DOCK FOR VIDEO CONFERENCING

(71) Applicant: Dell Products, L.P., Round Rock, TX (US)

(72) Inventor: Michiel Sebastiaan Emanuel Petrus Knoppert, Amsterdam (NL)

(73) Assignee: Dell Products, L.P., Round Rock, TX (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/172,379

(22) Filed: Feb. 10, 2021

(65) Prior Publication Data

US 2021/0211536 A1    Jul. 8, 2021

Related U.S. Application Data

(63) Continuation of application No. 16/733,018, filed on Jan. 2, 2020, now Pat. No. 10,938,974.

(51) Int. Cl.
| | |
|---|---|
| *H04M 1/04* | (2006.01) |
| *B25J 13/00* | (2006.01) |
| *B25J 9/16* | (2006.01) |
| *H04M 1/72409* | (2021.01) |
| *H04M 1/72412* | (2021.01) |

(52) U.S. Cl.
CPC ............ *H04M 1/04* (2013.01); *B25J 9/1694* (2013.01); *B25J 13/003* (2013.01); *H04M 1/72409* (2021.01); *H04M 1/72412* (2021.01); *H04M 2201/50* (2013.01)

(58) Field of Classification Search
CPC ............... H04M 1/04; H04M 1/72409; H04M 1/72412; H04M 2201/50; F16M 11/08; F16M 11/18; G05B 2219/37433
See application file for complete search history.

(56) References Cited

U.S. PATENT DOCUMENTS

| | | | |
|---|---|---|---|
| 9,398,250 B2 | 7/2016 | Sobti et al. | |
| 10,291,762 B2 | 5/2019 | Andersen et al. | |
| 2004/0082831 A1* | 4/2004 | Kobashikawa | A61H 19/32 600/38 |
| 2005/0088572 A1 | 4/2005 | Pandit et al. | |
| 2013/0342638 A1 | 12/2013 | Sobti et al. | |
| 2013/0344917 A1 | 12/2013 | Sobti et al. | |
| 2014/0064526 A1 | 3/2014 | Otto et al. | |
| 2015/0195489 A1 | 7/2015 | Sobti et al. | |
| 2017/0374188 A1 | 12/2017 | Chalabi et al. | |
| 2019/0171413 A1 | 6/2019 | Beatty et al. | |
| 2019/0339855 A1* | 11/2019 | Walkin | G06F 3/04883 |
| 2020/0379616 A1* | 12/2020 | Hshieh | G06F 16/9538 |
| 2022/0391158 A1* | 12/2022 | Lemmens | G06F 3/0486 |

\* cited by examiner

*Primary Examiner* — Thanh C Le
(74) *Attorney, Agent, or Firm* — Fogarty LLP

(57) ABSTRACT

A robotic dock for video conferencing is described. In some embodiments, a dock may be configured to receive an Information Handling System (IHS), the dock comprising: a motor; a microcontroller coupled to the motor; and a memory coupled to the microcontroller, the memory having program instructions stored thereon that, upon execution by the microcontroller, cause the dock to control the motor to rotate the IHS toward or away from a participant of a video conference.

20 Claims, 6 Drawing Sheets

ROBOTIC DOCK FOR VIDEO CONFERENCING

CROSS-REFERENCE TO RELATED APPLICATION

This patent application a continuation of, and claims priority to, U.S. patent application Ser. No. 16/733,018, titled "ROBOTIC DOCK FOR VIDEO CONFERENCING" and filed on Jan. 2, 2020, the disclosure of which is hereby incorporated herein by reference in its entirety.

FIELD

This disclosure relates generally to Information Handling Systems (IHSs), and more specifically, to a robotic dock for video conferencing.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Video conferencing is an example of an IHS application. Generally, video conferencing involves the use of IHSs for the reception and transmission of audio-video signals by users at different locations, for communications among participants in real time.

The inventor hereof has recognized that, when people meet in person, they interact with each other in natural ways. For example, they make eye-contact, use body language, and dynamically position themselves in relation to others. When people meet virtually in a video conferencing session, however, they lose those abilities, which often inhibits communications.

SUMMARY

Embodiments of a robotic dock for video conferencing are described. In an illustrative, non-limiting embodiment, a dock may be configured to receive an Information Handling System (IHS), the dock comprising: a motor; a microcontroller coupled to the motor; and a memory coupled to the microcontroller, the memory having program instructions stored thereon that, upon execution by the microcontroller, cause the dock to control the motor to rotate the IHS toward or away from a participant of a video conference.

In some cases, the IHS may include a smart phone or tablet. The motor may include a servo motor. The dock may also include a speaker array coupled to the motor, where the speaker array is configured to output an audio portion of the video conference. The dock may further include a microphone array. The program instructions, upon execution by the microcontroller, may cause the dock to detect a voice in a direction of the participant using the microphone array, and to rotate the IHS toward the participant in response to the detection.

Additionally, or alternatively, the program instructions, upon execution by the microcontroller, may cause the dock to detect a voice in another direction of another participant using the microphone array, and to rotate the IHS away from the participant and toward the other participant in response to the detection. Additionally, or alternatively, the program instructions, upon execution by the microcontroller, may cause the dock to: detect a voice in a direction of another participant using the microphone array; determine that the other participant is another dock; and ignore the other dock in response to the determination.

The dock may also include a light ring, and the program instructions, upon execution by the microcontroller, may cause the dock to detect a voice in a direction of the participant using the microphone array, and to change at least one of: (i) a color; or (ii) an intensity of at least one illuminating element of the light ring to indicate a direction of the participant. Additionally, or alternatively, the program instructions, upon execution by the microcontroller, may cause the dock to: detect a voice in a direction of an ignored participant; and change at least one of: (i) a color; or (ii) an intensity of at least one illuminating element of the light ring to indicate a direction of the ignored participant.

In another illustrative, non-limiting embodiment, a memory device may have program instructions stored thereon that, upon execution by a microcontroller of a dock configured to receive an IHS, cause the dock to: detect an event during a video conference; and turn the IHS toward or away from a participant of the video conference in response to the event. To detect the event, the program instructions, upon execution, may cause the dock to detect a sound emitted by the participant, and to turn the IHS toward the participant using a motor.

The program instructions, upon execution by the microcontroller, may cause the dock to change at least one of: (i) a color; or (ii) an intensity of at least one illuminating element of a light ring coupled to the dock to indicate a direction of the participant. To detect the event, the program instructions, upon execution, may cause the dock to detect of a sound emitted by another participant, and to turn the IHS away from the participant and toward the other participant using the motor. Additionally, or alternatively, the program instructions, upon execution by the microcontroller, cause the dock to change at least one of: (i) the color; or (ii) the intensity of the illuminating element of the light ring to, at least in part, indicate a direction of the other participant.

In yet another illustrative, non-limiting embodiment, in a dock configured to receive an IHS, a method comprising: detecting an event during a video conference; and turning the IHS toward or away from a participant of the video conference in response to the event. In some cases, detecting the event comprises detecting a sound emitted by the participant, and the method may include turning the IHS toward the participant using a motor.

The method may include changing at least one of: (i) a color; or (ii) an intensity of at least one illuminating element of a light ring coupled to the dock to indicate a direction of the participant. Detecting the event may include detecting a sound emitted by another participant, and the method further include turning the IHS away from the participant and toward the other participant using the motor. The method may also include changing at least one of: (i) a color; or (ii) an intensity of at least one other illuminating element of the light ring to indicate a direction of the other participant.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods described herein provide a robotic dock for video conferencing. In various embodiments, the dock may include an independently operating processing unit so that it does not require a separate IHS to control its robotic behavior. Rather, a local participant of a video conferencing session may wirelessly connect an IHS to the dock as if it were a wireless speaker and microphone device, for example, over BLUETOOTH, WiFi direct, or the like. Once the IHS is in wireless communications with the robotic dock, the dock's speakers output sound received from remote participants and its microphone array starts listening for local participants' voices.

At some point, a local participant may insert or mechanically couple an IHS (e.g., a smart phone, a tablet computer, etc.) to the robotic dock, as the IHS executes a video conferencing application that engages one or more remote participants in a video conferencing session with the local participant. Whenever the robotic dock encounters a participant's voice speaking, it rotates the IHS to face that source. As the dock turns, the display of the IHS also turns towards the active source, thereby establishing eye contact between local and remote participants. Therefore, by placing the IHS in the dock, local participants give remote participants a seat at the local table, with the ability to follow a conversation between multiple participants.

In some embodiments, systems and methods described herein may be used to train and/or correct the dock's robotic behavior to ignore false sources and/or to establish eye contact independently of which participant is currently active in a conversation, and in manner so as not to disrupt an ongoing video conference.

Moreover, to help participants override the dock's default follow-the-speaker behavior, different gestures may be made available. For example, manually turning the dock and/or IHS away from a false or undesirable source and pointing it to a correct or alternative source may serve as an input to train a machine learning (ML) or artificial intelligence (AI) model that, when executed by the dock's processor, drives behavior modifications. Gestures may also be used by a participant to grab the other participants' attention, for instance, by pointing the camera towards them (or anything else) before he or she starts speaking.

When multiple robotic docks are present in the same room, each dock may be configured to ignore other docks as sources. For instance, when a dock is turned on or otherwise activated, it may send out an audio signal that tells other docks to ignore it during at least a portion of the video conference call.

Figure 1:
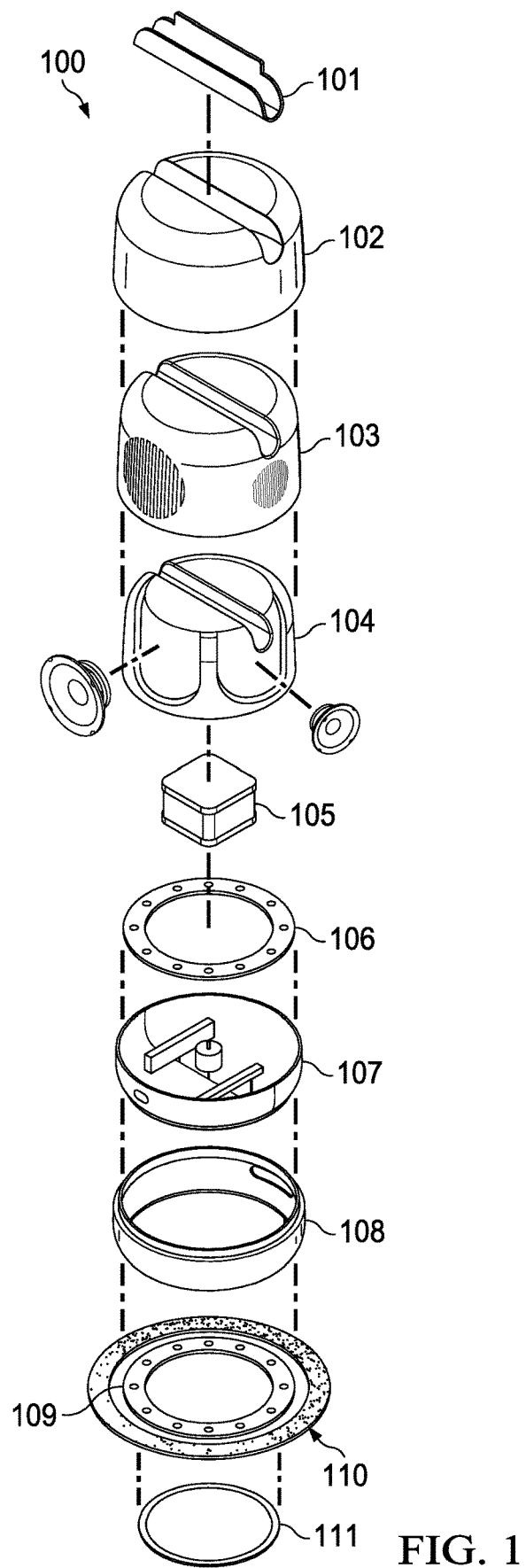
FIG. 1 is an exploded view of an example of a robotic dock for video conferencing, according to some embodiments.

To illustrate the foregoing, FIG. 1 is an exploded view of an example of robotic dock 100 for video conferencing, according to some embodiments. As shown, insert 101 is configured to receive IHS 200 (in FIG. 2) and to mechanically couple it to dock 100, where it sits atop fabric cover 102, plastic liner 103, and speaker carrier 104.

In some cases, speaker carrier 104 may include a circular ring or array of loudspeaker elements equally spaced from each other and configured so that, during a video conference, every participant around the table is capable of following the audio portion of the conference with clarity.

Speaker carrier 104 is coupled to motor 105, which may be implemented as any motor having a rotary actuator that allows for control of its angular position along with a sensor for position feedback, such as a servo motor, or the like. In operation, when motor 105 turns under control of a microprocessor (shown in FIG. 3), it effectively rotates insert 101 around its center around the vertical axis. When IHS 200 is coupled to insert 101, motor 105 effectively rotates IHS 200.

In some cases, microphone carrier 106 may include a circular ring or array of equally spaced microphone elements, and it may be used to determine the location and/or distance of sound sources with respect to dock 100, and/or to filter out unwanted noises.

One or more of elements 101-106 may be coupled to cylindrical base 107, as well as volume ring and rocker switch 108. Light Emitting Diode (LED) carrier 109 may include a circular ring or array of equally spaced illuminating elements, and it may be used to indicate the location of active, passive, and/or ignored audio sources around dock 100, to control the output volume, etc. In some implementations, blue lights signify sources and the intensity of the light shows their level of activity (e.g., duration and/or loudness). When a source is ignored the corresponding light may turn red. Moreover, LED carrier 109 may be optically coupled to lightguide 110 near bottom portion 111, which in turn may include power, reset, and/or wireless interface controls or switches.

Although several of the aforementioned elements are shown having generally cylindrical or circular shapes, it should be noted that other shapes may be used in different dock implementations (e.g., oval, square, etc.).

Figure 2:
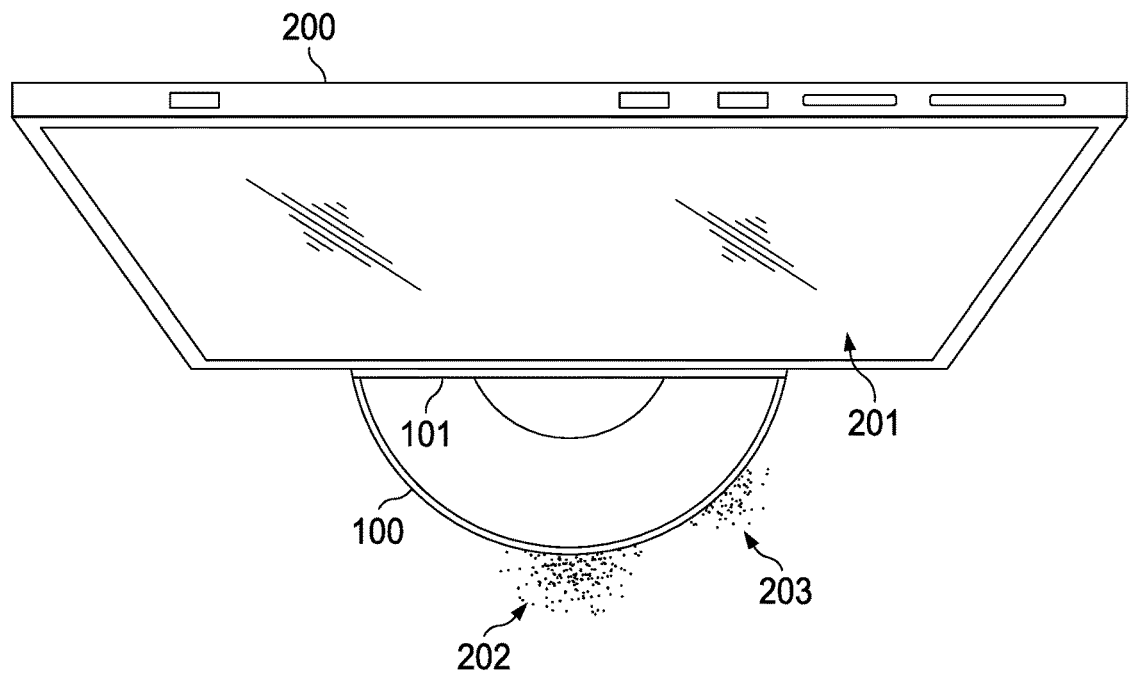
FIG. 2 is a perspective view of an example of a robotic dock holding an Information Handling System (IHS), according to some embodiments.

FIG. 2 is a perspective view of an example of robotic dock 100 holding IHS 200, according to some embodiments. Particularly, IHS 200 sits inside insert 101 of dock 100 during a video conference call with remote participant 201. In this example, light lobe 202 (produced by one or more illuminating elements of LED array 109) indicates, herewith a higher intensity, that a local participant in its direction currently has a more prominent speaking role than another local participant in the direction of light lobe 203. In other implementations, the light indications provided via LED array 109 may distinguish between active and passive local participants using different colors.

In this case, dock 100 has rotated remote participant 201 completely toward the actively speaking (or more actively speaking) participant who is in the direction of lobe 202. In other cases, however, if the distance or angle between the two concurrently active participants, or between an active and a passive participant, is within a threshold value, and/or if the loudness and/or duration of their speech indicate that they have similar roles in the video conference, IHS 200 may be rotated to an intermediary position between those two participants. In those cases, the angle of rotation may be calculated using a weighted average of the loudness and/or duration of the speech of two or more local participants, so that the IHS is turned proportionally more toward the participant with a more prominent role.

Figure 3:
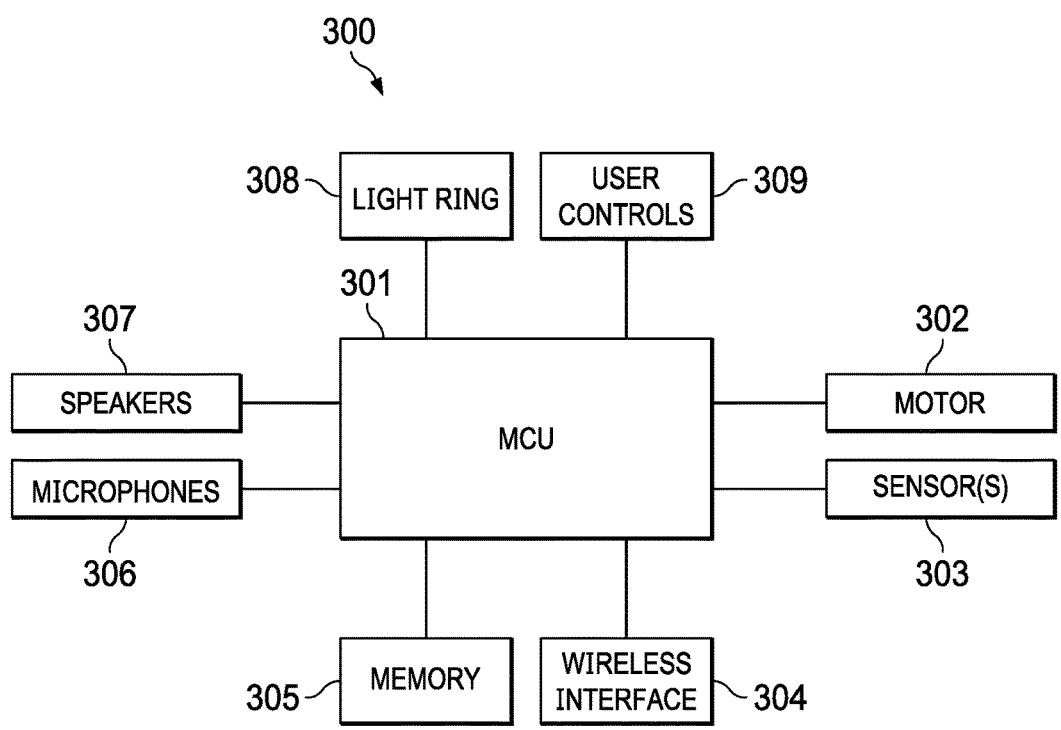
FIG. 3 is a block diagram of examples of internal components of a robotic dock, according to some embodiments.

FIG. 3 is a block diagram of examples of internal components of robotic dock 100. In various embodiments, one or more of components 300 may be housed within base 107. As depicted, components 300 include processor or microcontroller unit (MCU) 301. MCU 301 is coupled to memory 305 having program instructions stored thereon that, upon execution by MCU 301, cause dock 100 to perform one or more of the operations described herein. For example, program instructions may implement an ML or AI model trainable for identifying participants and different sound profiles (e.g. noise, music, and voice), as well as for responding with automated behaviors to detected events by turning IHS 200 toward or away from any given source and/or illuminating different patterns around dock 100 using light ring 308.

MCU 301 is coupled to wireless interface 304 (e.g., RF circuitry and antenna) configured to implement the BLUETOOTH, WiFi direct, or other suitable wireless communication protocol.

MCU 301 is also coupled to motor circuitry 302, which is configured to operate motor 105 and position or angular sensor(s) 303. Meanwhile, sensor(s) 303 are configured to provide current position/angle feedback to MCU 301. MCU is also coupled to speakers 307 (speaker array 104), microphones 306 (microphone array 106), light ring 308 (light array 109), and one or more user controls 309 (e.g., buttons, switches, etc.). In various implementations, elements or modules 302-309 may be coupled to MCU 301 using any suitable electronic circuitry, bus, interface, or the like.

Figure 4:
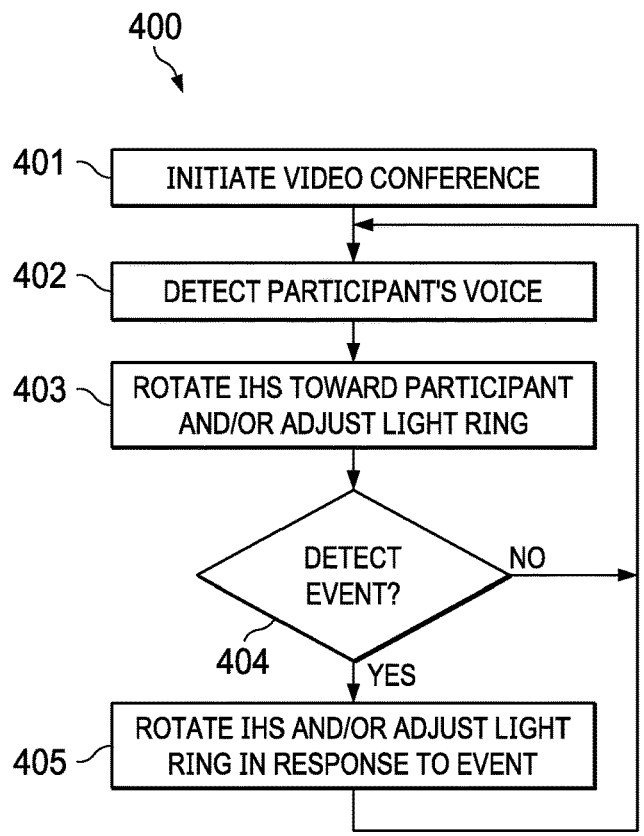
FIG. 4 is a flowchart of an example of a method for operating a robotic dock, according to some embodiments.

FIG. 4 is a flowchart of an example of method 400 for operating robotic dock 100. In some embodiments, method 400 may be performed in response to MCU 301's execution of program instructions stored in memory 305. Particularly, at block 401, dock 100 begins taking part in a video conferencing session. For example, a participant may wirelessly pair and connect IHS 200 to dock 100 via wireless interface 304, such that speakers 307 can reproduce sound received from one or more remote participants, and microphones 306 pick up sound produced by local participants, during execution of a video conference session by the IHS.

At block 402, MCU 301 detects a participant's voice. In some cases, MCU 301 may implement audio processing usable to determine whether an incoming audio signal fits a noise, music, and/or speech profile, for example, using spectral analysis and/or pattern recognition techniques. Still at block 402, MCU 301 may triangulate and identify a position and/or angle of an active or speaking local participant relative to dock 100 and/or IHS 200 using microphones 306. Then, at block 403, MCU 301 may rotate IHS 200 toward active participant(s). Additionally, or alternatively, MCU 301 may adjust the intensity and/or color of one or more illuminating elements (e.g., LED) of light ring 308 to indicate the position and/or relative loudness of primary and secondary participants.

At block 404, MCU 301 may detect an event or command during the video conference. Examples of events or commands may include movement of one or more active local participants, a new local participant's speech being detected, another dock being detected near dock 100, and/or manual rotation of dock 100 to train or override (e.g., to include or exclude a participant) its robotic behavior. If no such event is detected, control returns to block 402. Otherwise control passes to block 405.

At block 405, MCU 301 may turn motor 302 to thereby follow IHS 200 toward a moving local participant, turn away from the local participant and toward a new local participant, and/or turn away from an ignored audio source and/or from another dock. For example, when another dock is present, it may emit a non-audible audio signal using its own speakers such that event 404 includes the MCU 301's detection of the other dock's position and/or distance using microphones 306. In response, at block 405, MCU 301's may prevent dock 100 from turning IHS 200 directly toward the other dock (and respective IHS), in addition to emitting its own non-audible audio signal using speakers 307 to facilitate the other dock's detection of dock 100.

Additionally, or alternatively, at block 405, MCU 301 may adjust the intensity and/or color of one or more illuminating elements (e.g., LED) of light ring 308 to indicate the position and/or relative loudness of primary and secondary participants, and/or the position and/or relative loudness of an ignored audio source.

Figure 5:
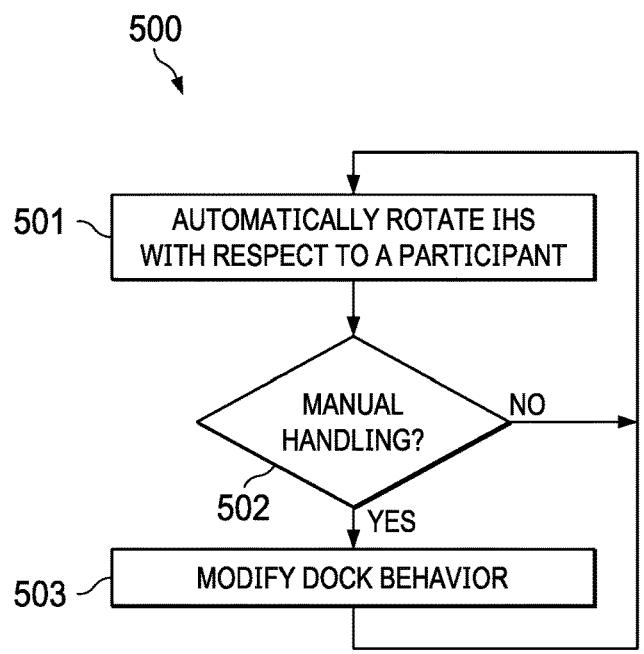
FIG. 5 is a flowchart of an example of a method for training a robotic dock, according to some embodiments.
Figure 6A:
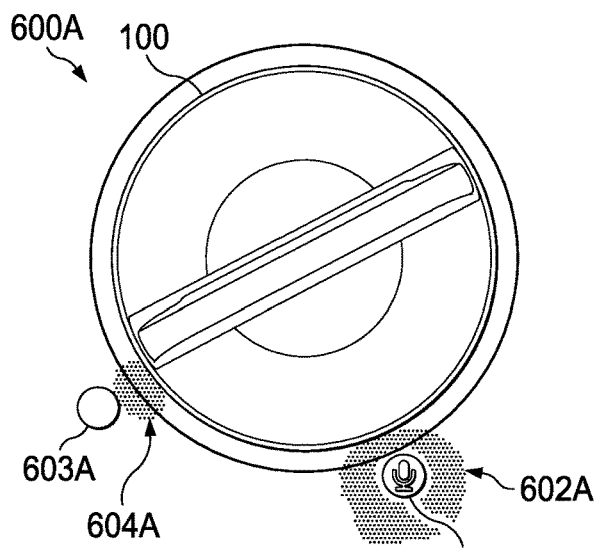
FIGS. 6A-D are diagrams of examples of various robotic dock states attained during normal and/or training operation(s), according to some embodiments.
Figure 6B:
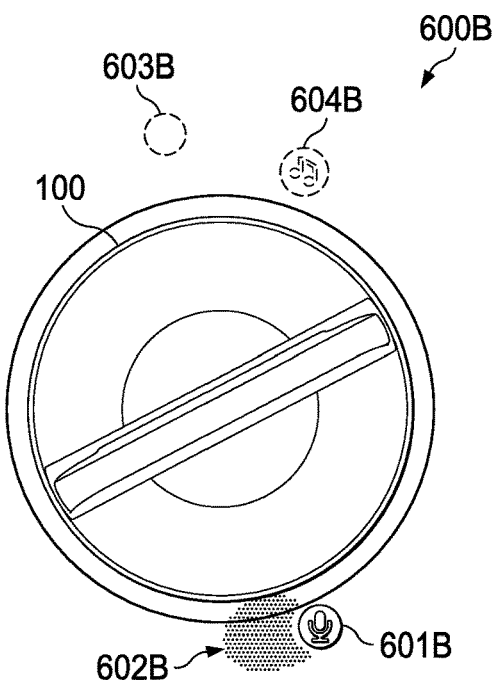
Figure 6C:
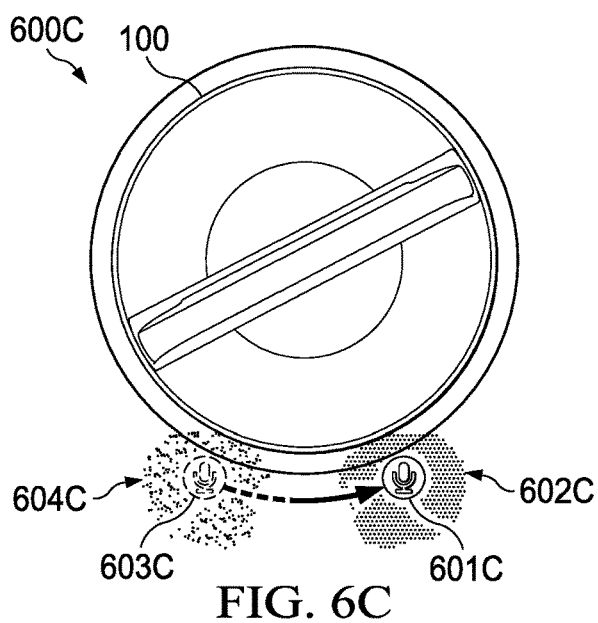
Figure 6D:
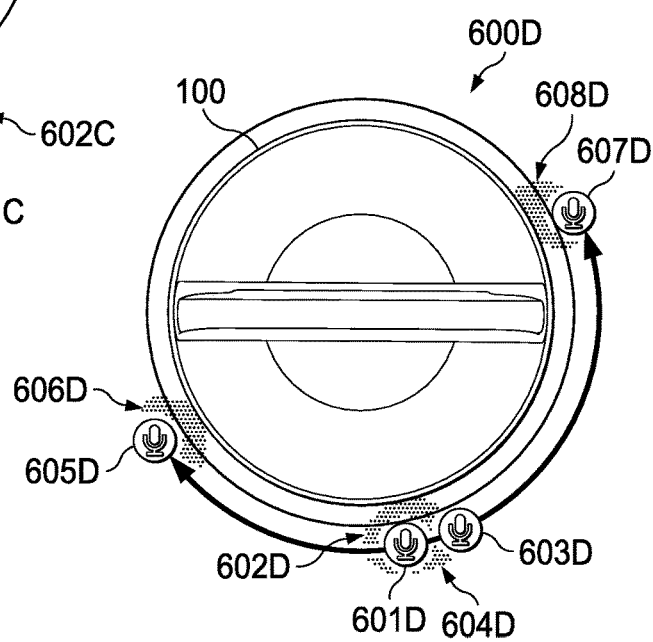

In some cases, the automated robotic behavior of dock 100 enabled by ML and/or AI algorithms may be overridden to train an ML or AI model and/or to correct undesirable actions in a customized manner. To that end, FIG. 5 is a flowchart of an example of method 500 for training robotic dock 100. In some embodiments, method 500 may be performed in response to MCU 301's execution of program instructions stored in memory 305. Particularly, at block 501, MCU 301 automatically turns motor 302 to thereby rotate IHS 200 toward or away from a detected local participant (e.g., the current or last local speaker during the video session).

At block 502, MCU 301 determines whether dock 100 has been manually handled or turned by a local participant, for example, using position sensors 303. If not, controller returns to block 501. Otherwise, at block 503, MCU 301 feeds selected inputs such as, for example, an angle or amount of rotation and a direction of the rotation (to or away from a detected and/or identified audio source) to the ML algorithm to teach dock 101 to ignore the audio source in the future (e.g., in the same video conference, in a subsequent video conferences, in any video conference among the same group of people, etc.) and/or to focus on a non-speaking participant or other item that does not produce sound.

In various implementations, other contextual information usable by the ML/AI engine to train the dock's robotic behavior (e.g., to control the speed of rotation, automatically ignored sources, etc.) may include: a number of local participants, a number of remote participants, an audio loudness level for a duration preceding a manual handling operation, a number and position of other docks in the same video conference, a duration of the video conference, a time of day, an repeated order or sequence of different manual handling operations, etc. In cases where MCU 301 is operable to execute voice recognition operations based upon instructions stored in memory 302, examples of additional context information usable to change dock 100's behavior include the identity of the active participant and/or the language spoken at the time of the manual handling operation.

FIGS. 6A-D are diagrams of examples of various robotic dock states 600A-D attained during normal and/or training operation(s). Particularly, in state 600A, dock 100 is configured to determine the presence of active audio sources. Dock 100 turns IHS 200 toward local participant 601A ("primary participant") in response to currently detecting a voice in the captured audio signal from the local participant direction. In addition, a currently passive, silent, or lower speaking local participant 603A ("secondary participant") may also be identified, for example, based on previously or concurrently detected voices. To indicate this distinction, light ring 308 may be controlled to produce light lobe 602A larger and/or brighter than light lobe 604A.

In state 600B, dock 100 may use microphones 306 to filter out selected sources based upon distance (e.g., by triangulation) or sound profile (e.g., exclude everything that is not a human voice). As such, dock 100 detects local participant 601B and ignores music source 604B. In this example, sound source 603B is outside the bounds of detection of dock 100. Similarly as before, the detection, position, distance, and/or loudness of local participant 601B may be indicated using light lobe 602B, and there is no visual indication of music source 604B. In other cases, light ring 308 may indicate different types of sound sources (e.g., noise, music, or voice) with different colors.

In state 600C, dock 100 is trained to ignore source 603C. If needed (e.g., a noisy but otherwise non-speaking local participant) may be ignored by dock 100 in response to manual handling operation that turns IHS 200 from source 603C and toward local participant 601C. In this case, the detection, position, distance, and/or loudness of local participant 601C may be indicated with a first color lobe 602C (e.g., blue), whereas the presence of newly ignored source 603C may be indicated using a different color (e.g., red) to create lobe 604C.

In state 600D, dock 100 is set by default to address any presently active source(s), thus rotating IHS 200 back and forth between local participants 601D, 603D, 605D, and 607D. In some cases, when two or more local participants speak at the same time, dock 100 may maintain IHS 200 facing the last active participant for a preset amount of time, and then pan back and forth between all active participants. This behavior may be overridden, for example, by manually turning dock 100 toward a selected one of the active participants. Moreover, in some cases, when two or more sources are distant from each other by an angle smaller than a threshold (e.g., as between participants 601D and 603D), the sources may be treated as a single source for purposes of rotating IHS 200.

In some situations, a passer-by or non-participant may be ignored using manual handling of dock 100. Specifically, by grabbing IHS 200 and/or dock 100 and turning it away from that source, dock 100 responds by subsequently ignoring it. Additionally, or alternatively, if a local participant would like to have a side conversation with another local participant apart from the video conference, they may point dock 100 away from them. Later, once the side conversation is finished, the participant may again be included in the video conference by turning dock 100 toward them. These corrections may be fed into the ML algorithm to make each dock behave uniquely, and over time become tuned to their specific location and users.

Figure 7A:
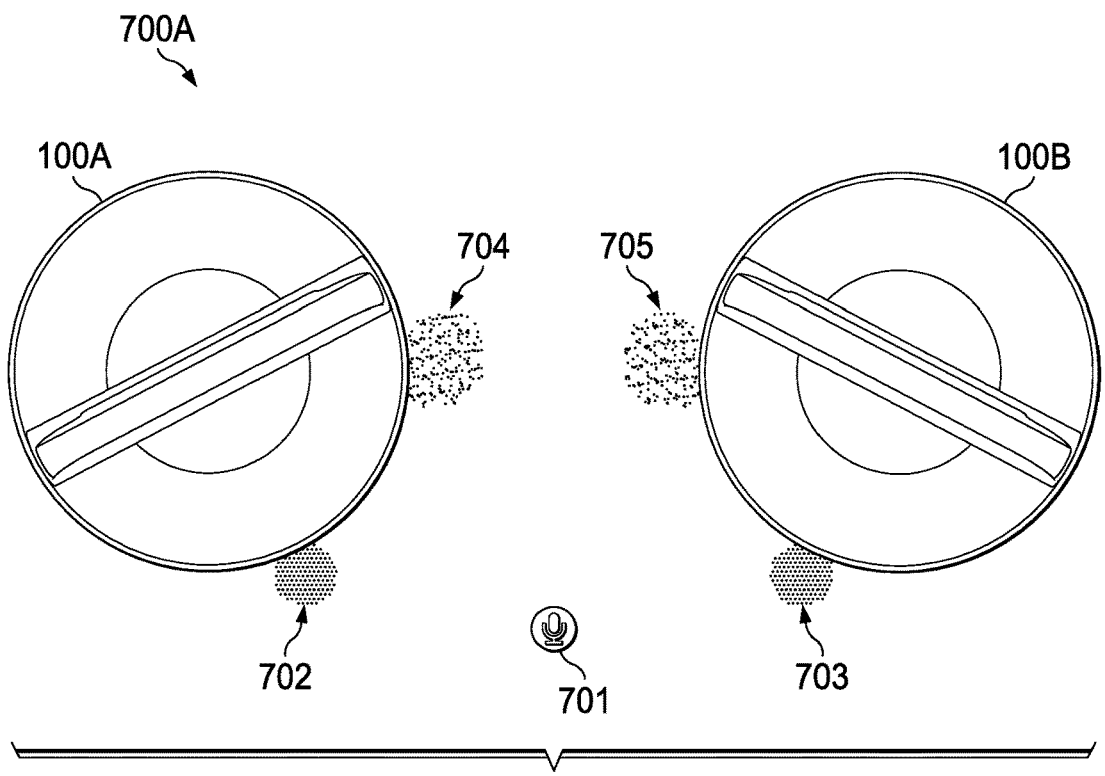
FIGS. 7A and 7B are diagrams of examples of different robotic dock states in the case of two docks being used concurrently in a same video conferencing session, according to some embodiments.
Figure 7B:
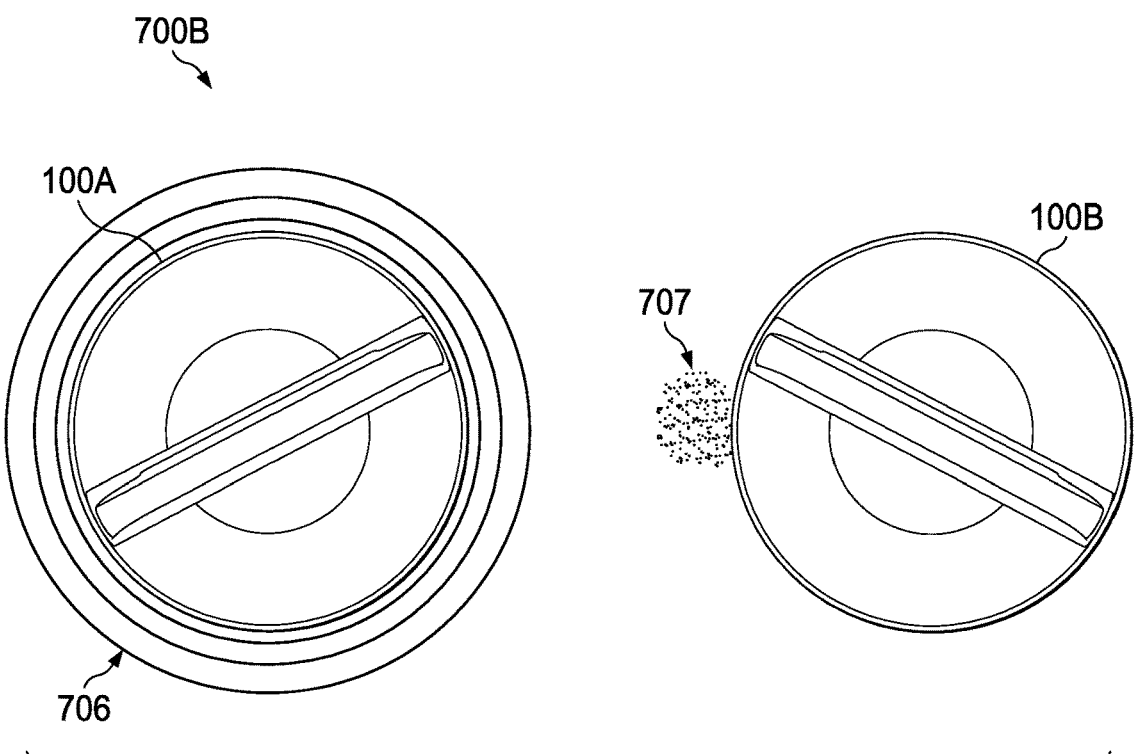

FIGS. 7A and 7B are diagrams of examples of different robotic dock states 700A and 700B in the case of two docks being used concurrently in a same video conferencing session, according to some embodiments. In state 700A, first dock 100A and second dock 100B detect local participant 701 and learn to ignore each other, for purposes of rotating their respective IHSs, based on the manual handling of each dock. A participant may teach each of docks 100A and 100B to ignore each other by pointing them away from one another, for example, when both remote participants are both actively speaking. As a result, blue light lobes 702 and 703 indicate the location of participant 701, and red light lobes 704 and 705 indicate the location of ignored sources 100B and 100A, respectively.

Additionally, or alternatively, as shown in state 700B, each of docks 100A and 100B may be configured to produce a signal (e.g., a high frequency, inaudible audio signal) to inform the other dock of its presence. For example, dock 100A may produce signal 706 upon powering up. In response, dock 100B locates signal 706 and ignores dock 100A in response. As a result, red light lobe 707 may indicate the location of ignored source 100A. Moreover, dock 100B may produce a similar signal as signal 706 so that and dock 100A can learn the position of dock 100B and ignore it as an audio source, at least for purposes of dock 100A avoiding turning its IHS toward dock 100B during the video conference. It should be noted that this method works for any number of docks or conference sets.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 8:
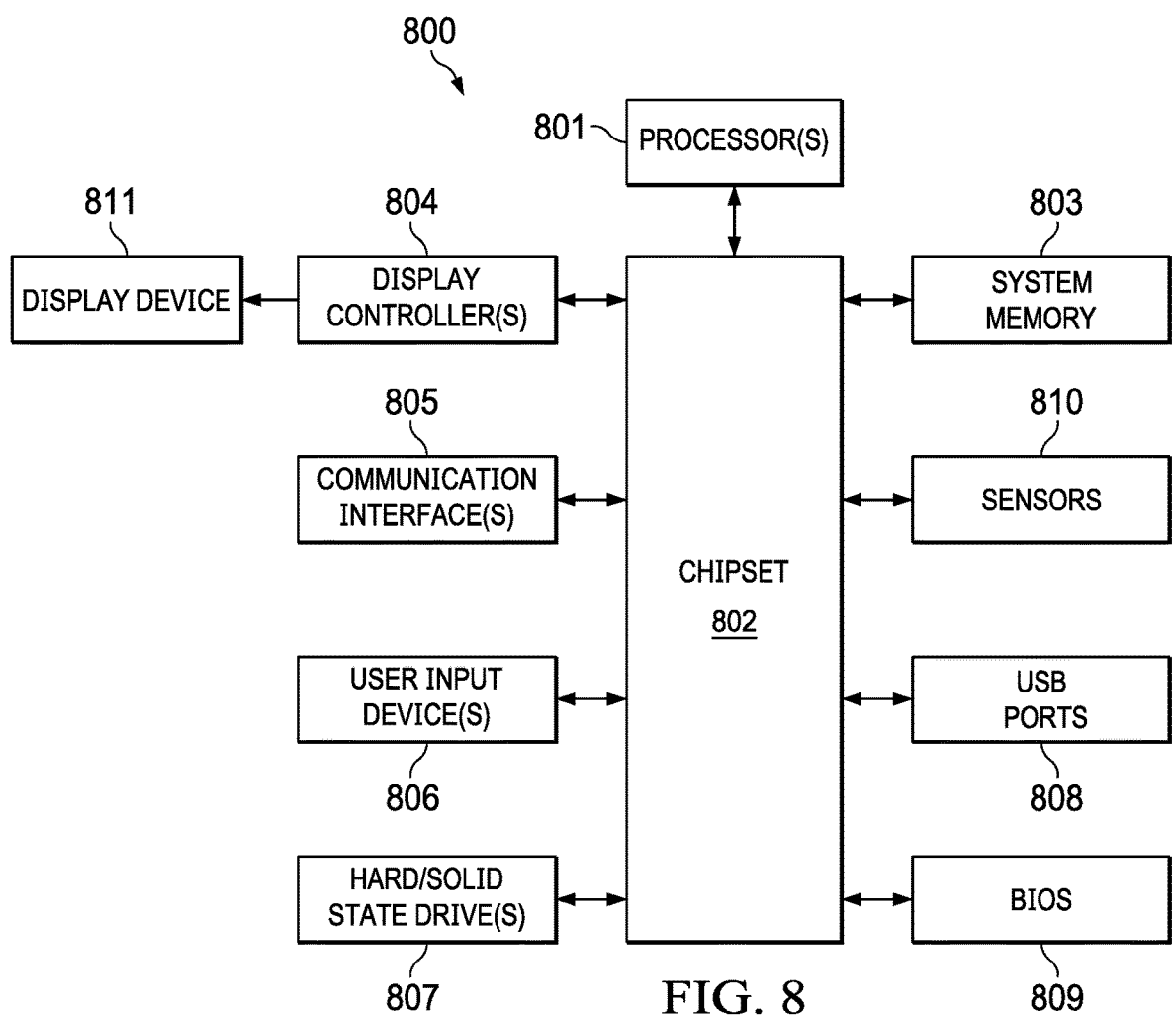
FIG. 8 is a block diagram of an example of internal components of an IHS, according to some embodiments.

FIG. 8 is a block diagram of an example of internal components 800 of IHS 200, according to some embodiments. As depicted, components 800 include processor 801. In various embodiments, IHS 200 may be a single-processor system, or a multi-processor system including two or more processors. Processor(s) 801 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 200 includes chipset 802 coupled to processor(s) 801. In certain embodiments, chipset 802 may utilize a Quick-Path Interconnect (QPI) bus to communicate with processor(s) 801. In various embodiments, chipset 802 may provide processor(s) 801 with access to a number of resources. Moreover, chipset 802 may be coupled to communication interface(s) 805 to enable communications with other IHSs and/or peripheral devices via various wired and/or wireless networks, such as Ethernet, WiFi, BLU-ETOOTH, cellular or mobile networks (e.g., CDMA, TDMA, LTE, etc.), satellite networks, or the like. For example, communication interface(s) 805 may be coupled to chipset 802 via a PCIe bus.

Chipset 802 may be coupled to display controller(s) 804, which may include one or more or graphics processor(s) (GPUs) on a graphics bus, such as an Accelerated Graphics Port (AGP) or Peripheral Component Interconnect Express (PCIe) bus. As shown, display controller(s) 804 provide video or display signals to display device 811.

Display device 811 may include a flexible display that is deformable (e.g., bent, folded, rolled, or stretched) by an external force applied thereto. For example, display device 811 may include LCD, OLED, or AMOLED, plasma, electrophoretic, or electrowetting panel(s) or film(s). Moreover, display device 811 may include a plurality of pixels arranged in a matrix, configured to display visual information, such as text, two-dimensional images, video, three-dimensional images, etc.

Display device 811 may be configured to sense haptic and/or physical touch events, and to generate touch information. To this end, display device 811 may include a touchscreen matrix (e.g., a layered capacitive panel or the like) and/or touch controller configured to receive and interpret multi-touch gestures from a user touching the screen with a stylus, or one or more fingers. Generally, display and/or touch control aspects of display device 811 may be collectively operated and controlled by display controller 804.

Chipset 802 may also provide processor 801 and/or display controller(s) 804 with access to memory 803. In various embodiments, system memory 803 may be implemented using any suitable memory technology, such as static RAM (SRAM), dynamic RAM (DRAM) or magnetic disks, or any nonvolatile/Flash-type memory, such as a solid-state drive (SSD) or the like. Memory 803 may store program instructions that, upon execution by processor 801 and/or controller(s) 804, present a UI interface to a user of IHS 100.

Chipset 802 may further provide access to one or more hard disk and/or solid-state drives 807. In certain embodiments, chipset 802 may also provide access to one or more optical drives or other removable-media drives. In certain embodiments, chipset 802 may also provide access to one or more Universal Serial Bus (USB) ports 808.

Upon booting of IHS 200, processor(s) 801 may utilize Basic Input/Output System (BIOS) 809 instructions to initialize and test hardware components coupled to IHS 100 and to load an Operating System (OS) for use by IHS 200. BIOS 809 provides an abstraction layer that allows the OS to interface with certain hardware components that are utilized by IHS 100. Via the hardware abstraction layer provided by BIOS 809, software stored in memory 803 and executed by the processor(s) 801 of IHS 200 is able to interface with certain I/O devices that are coupled to IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 802 may also provide access to one or more user input devices 806, for example, using a super I/O controller or the like. For instance, chipset 802 may provide access to a keyboard (e.g., keyboard 502), mouse, trackpad, stylus, totem, or any other peripheral input device, including touchscreen display 811. These input devices may interface with chipset 802 through wired connections (e.g., in the case of touch inputs received via display controller(s) 804) or wireless connections (e.g., via communication interfaces(s) 805). In some cases, chipset 802 may be used to interface with user input devices such as keypads, biometric scanning devices, and voice or optical recognition devices.

In certain embodiments, chipset 802 and/or EC 809 may provide an interface for communications with one or more sensors 810. Sensors 810 may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration and/or lid sensor(s).

In various embodiments, IHS 200 may not include all of components 800 shown in FIG. 8. Additionally, or alternatively, IHS 200 may include components in addition to those shown in FIG. 8. Additionally, or alternatively, components represented as discrete in FIG. 8 may be integrated with other components. For example, all or a portion of the functionality provided by the illustrated components may be implemented in a System-On-Chip (SOC), or the like.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises,"

"has," "includes" or "contains" one or more operations possesses those one or more operations but is not limited to possessing only those one or more operations.

The invention claimed is:

1. A memory device having program instructions stored thereon that, upon execution by a microcontroller of a dock configured to receive an Information Handling System (IHS), cause the dock to:
   detect a sound during a video conference; and
   turn the IHS with respect to a participant of the video conference in response to the sound.

2. The memory device of claim 1, wherein the program instructions, upon execution, further cause the dock to:
   determine that the sound is emitted by the participant; and
   turn the IHS toward the participant.

3. The memory device of claim 2, wherein the program instructions, upon execution, further cause the dock to change at least one of: (i) a color; or (ii) an intensity of at least one illuminating element of a light ring to indicate a direction of the participant.

4. The memory device of claim 3, wherein the program instructions, upon execution, further cause the dock to:
   detect another sound during the video conference;
   determine that the other sound is emitted by another participant; and
   turn the IHS away from the participant and toward the other participant.

5. The memory device of claim 4, wherein the program instructions, upon execution, further cause the dock to change at least one of: (i) the color; or (ii) the intensity of the illuminating element to indicate another direction of the other participant.

6. The memory device of claim 3, wherein the program instructions, upon execution, further cause the dock to:
   detect another sound during the video conference;
   determine that the other sound is emitted by an ignored participant; and
   abstain from turning the IHS toward the ignored participant.

7. The memory device of claim 6, wherein the program instructions, upon execution, further cause the dock to change at least one of: (i) the color; or (ii) the intensity of the illuminating element to indicate another direction of the ignored participant.

8. The memory device of claim 3, wherein the program instructions, upon execution, further cause the dock to:
   detect another sound during the video conference;
   determine that the other sound is emitted by another dock; and
   abstain from turning the IHS toward the other dock.

9. The memory device of claim 8, wherein the program instructions, upon execution, further cause the dock to change at least one of: (i) the color; or (ii) the intensity of the illuminating element to indicate another direction of the other dock.

10. In a dock configured to receive an Information Handling System (IHS), a method comprising:
    detecting a sound during a video conference; and
    turning the IHS with respect to a participant of the video conference in response to the sound.

11. The method of claim 10, further comprising changing at least one of: (i) a color; or (ii) an intensity of at least one illuminating element of a light ring to indicate a direction of the participant.

12. The method of claim 11, further comprising:
    detecting another sound during the video conference;
    determining that the other sound is emitted by another participant; and
    turning the IHS away from the participant and toward the other participant.

13. The method of claim 12, further comprising changing at least one of: (i) the color; or (ii) the intensity of the illuminating element to indicate another direction of the other participant.

14. The method of claim 11, further comprising:
    detecting another sound during the video conference;
    determining that the other sound is emitted by another dock; and
    abstaining from turning the IHS toward the other dock.

15. The method of claim 14, further comprising changing at least one of: (i) the color; or (ii) the intensity of the illuminating element to indicate another direction of the other dock.

16. A dock configured to receive an Information Handling System (IHS), the dock comprising:
    a processor; and
    a memory coupled to the processor, the memory having program instructions stored thereon that, upon execution, cause the dock to
    detect a sound during a video conference; and
    turn the IHS with respect to a participant of the video conference in response to the sound.

17. The dock of claim 16, wherein the program instructions, upon execution, further cause the dock to:
    determine that the sound is emitted by the participant; and
    turn the IHS toward the participant.

18. The dock of claim 16, wherein the program instructions, upon execution, further cause the dock to:
    detect another sound during the video conference;
    determine that the other sound is emitted by another participant; and
    turn the IHS away from the participant and toward the other participant.

19. The dock of claim 16, wherein the program instructions, upon execution, further cause the dock to:
    detect another sound during the video conference;
    determine that the other sound is emitted by an ignored participant; and
    abstain from turning the IHS toward the ignored participant.

20. The dock of claim 16, wherein the program instructions, upon execution, further cause the dock to:
    detect another sound during the video conference;
    determine that the other sound is emitted by another dock; and
    abstain from turning the IHS toward the other dock.

* * * * *